United States Patent
Eguchi et al.

(10) Patent No.: US 12,359,405 B2
(45) Date of Patent: Jul. 15, 2025

(54) WORK MACHINE OBSTACLE NOTIFICATION SYSTEM AND WORK MACHINE OBSTACLE NOTIFICATION METHOD

(71) Applicant: Komatsu Ltd., Tokyo (JP)

(72) Inventors: Taro Eguchi, Tokyo (JP); Koichi Nakazawa, Tokyo (JP); Takeshi Kurihara, Tokyo (JP); Yoshiyuki Shitaya, Tokyo (JP)

(73) Assignee: Komatsu Ltd., Tokyo (JP)

( * ) Notice: Subject to any disclaimer, the term of this patent is extended or adjusted under 35 U.S.C. 154(b) by 406 days.

(21) Appl. No.: 17/908,184

(22) PCT Filed: Mar. 29, 2021

(86) PCT No.: PCT/JP2021/013287
§ 371 (c)(1),
(2) Date: Aug. 30, 2022

(87) PCT Pub. No.: WO2021/215198
PCT Pub. Date: Oct. 28, 2021

(65) Prior Publication Data
US 2023/0120720 A1    Apr. 20, 2023

(30) Foreign Application Priority Data

Apr. 20, 2020  (JP) .................. 2020-074754

(51) Int. Cl.
*E02F 9/26* (2006.01)
*E02F 9/24* (2006.01)
(52) U.S. Cl.
CPC .............. *E02F 9/261* (2013.01); *E02F 9/24* (2013.01)

(58) Field of Classification Search
None
See application file for complete search history.

(56) References Cited

U.S. PATENT DOCUMENTS

| | | |
|---|---|---|
| 2002/0152079 A1 | 10/2002 | Furuta |
| 2010/0060440 A1 | 3/2010 | Suzuki |
| 2010/0214086 A1 | 8/2010 | Yoshizawa et al. |
| 2013/0141581 A1 | 6/2013 | Mitsuta et al. |

(Continued)

FOREIGN PATENT DOCUMENTS

| | | |
|---|---|---|
| CN | 101536057 A | 9/2009 |
| CN | 101980890 A | 2/2011 |

(Continued)

OTHER PUBLICATIONS

Nakagawa et al., "A Human Machine Interface Framework for Autonomous Vehicle Control," 2017 IEEE 6th Global Conference on Consumer Electronics (GCCE), Dec. 1-3, 2017,

*Primary Examiner* — Todd Melton
*Assistant Examiner* — Jason R Roberson
(74) *Attorney, Agent, or Firm* — Fish & Richardson P.C.

(57) ABSTRACT

An obstacle determination unit determines whether an obstacle is present in a periphery of the work machine. An action detection unit detects an action of an operator of the work machine. An action determination unit determines whether the detected action is a confirmation action executed at the time of safety confirmation. A notification unit changes a mode of notification when the action is determined to be the confirmation action.

9 Claims, 9 Drawing Sheets

(56) References Cited

U.S. PATENT DOCUMENTS

| | | | |
|---|---|---|---|
| 2013/0147958 A1 | 6/2013 | Mitsuta et al. | |
| 2014/0090505 A1 | 4/2014 | Okuyama et al. | |
| 2014/0347483 A1 | 11/2014 | Nakanishi et al. | |
| 2016/0144785 A1* | 5/2016 | Shimizu | B60K 35/60 340/435 |
| 2016/0176338 A1* | 6/2016 | Husted | B60Q 9/008 340/435 |
| 2016/0200252 A1 | 7/2016 | Oota et al. | |
| 2016/0202351 A1 | 7/2016 | Uotsu | |
| 2017/0298595 A1 | 10/2017 | Machida et al. | |
| 2017/0349184 A1 | 12/2017 | Tzirkel-Hancock et al. | |
| 2018/0032081 A1 | 2/2018 | Etoh | |
| 2018/0211663 A1 | 7/2018 | Shin et al. | |
| 2018/0258616 A1 | 9/2018 | Kiyota et al. | |
| 2019/0168776 A1 | 6/2019 | Imaizumi et al. | |
| 2019/0292024 A1 | 9/2019 | Ishikawa et al. | |
| 2019/0352885 A1 | 11/2019 | Kurokami et al. | |
| 2020/0090518 A1 | 3/2020 | Sano et al. | |
| 2020/0142400 A1 | 5/2020 | Kuwabara et al. | |
| 2020/0318321 A1 | 10/2020 | Kurokawa et al. | |
| 2021/0183252 A1* | 6/2021 | Bittar | G08G 5/57 |

FOREIGN PATENT DOCUMENTS

| | | |
|---|---|---|
| CN | 102774324 A | 11/2012 |
| CN | 202686359 U | 1/2013 |
| CN | 103098112 A | 5/2013 |
| CN | 103826919 A | 5/2014 |
| CN | 105083291 A | 11/2015 |
| CN | 105474635 A | 4/2016 |
| CN | 205168320 U | 4/2016 |
| CN | 107662607 A | 2/2018 |
| CN | 107933810 A | 4/2018 |
| CN | 108698550 A | 10/2018 |
| CN | 109689983 A | 4/2019 |
| CN | 109831635 A | 5/2019 |
| CN | 110088035 A | 8/2019 |
| CN | 110121739 A | 8/2019 |
| CN | 110770106 A | 2/2020 |
| JP | 11139229 A | 5/1999 |
| JP | 2014085832 A | 5/2014 |
| JP | 2014199546 A | 10/2014 |
| JP | 2015125686 A | 7/2015 |
| JP | 2015153318 A | 8/2015 |
| JP | 2016035791 A | 3/2016 |
| JP | 2017066860 A | 4/2017 |
| JP | 2017101419 A | 6/2017 |
| JP | 2017101420 A | 6/2017 |
| WO | WO 2012/169229 A1 | 12/2012 |
| WO | 2015001665 A1 | 1/2015 |
| WO | WO 2016158255 A1 | 10/2016 |
| WO | WO 2017061183 A1 | 4/2017 |
| WO | WO 2018220774 A1 | 12/2018 |
| WO | WO 2019131955 A1 | 7/2019 |

* cited by examiner

FIG. 5

| SOUND PATTERN | GESTURE PATTERN | CONFIRMATION DIRECTION |
|---|---|---|
| LEFT REAR, ALL RIGHT | INDEX FINGER LEFT DIRECTION BY 80° OR MORE AND LESS THAN 160° | LEFT REAR REGION |
| REAR, ALL RIGHT | INDEX FINGER RIGHT DIRECTION BY 20° OR MORE AND LESS THAN 50° | REAR REGION |
| RIGHT REAR, ALL RIGHT | INDEX FINGER RIGHT DIRECTION BY 80° OR MORE AND LESS THAN 160° | RIGHT REAR REGION |
| RIGHT FRONT, ALL RIGHT | INDEX FINGER RIGHT DIRECTION BY 0° OR MORE AND LESS THAN 90° | RIGHT FRONT REGION |

WORK MACHINE OBSTACLE NOTIFICATION SYSTEM AND WORK MACHINE OBSTACLE NOTIFICATION METHOD

CROSS-REFERENCE TO RELATED APPLICATIONS

This application is a National Stage application under 35 U.S.C. § 371 of International Application No. PCT/JP2021/013287, filed on Mar. 29, 2021, which claims priority to Japanese Patent Application No. 2020-074754, filed on Apr. 20, 2020. The contents of the prior applications are incorporated herein in their entirety.

TECHNICAL FIELD

The present invention relates to a work machine obstacle notification system and a work machine obstacle notification method.

Priority is claimed on Japanese Patent Application No. 2020-074754, filed Apr. 20, 2020, the content of which is incorporated herein by reference.

BACKGROUND ART

Patent Document 1 discloses technology related to a peripheral monitoring system that detects a person in the periphery of a work machine. According to the technology described in Patent Document 1, the peripheral monitoring system detects an obstacle in the periphery.

RELATED ART DOCUMENTS

Patent Documents

[Patent Document 1]
Japanese Unexamined Patent Application, First Publication No. 2016-035791

SUMMARY OF INVENTION

Problem to be Solved by the Invention

When a peripheral monitoring system detects an obstacle, the peripheral monitoring system notifies that the obstacle is present from a display, a speaker, or the like. An operator of a work machine receives the notification by the peripheral monitoring system, confirms that the obstacle is present, and confirms that safety is ensured.

By the way, when the operator wants to end the notification of the confirmed obstacle, it is necessary to instruct the peripheral monitoring system to end the notification by pressing the cancel button or the like. Therefore, the operator needs to confirm the obstacle and instruct the system to end the notification every time the presence of the obstacle is notified, which is complicated.

An object of the present invention is to provide a work machine obstacle notification system and a work machine obstacle notification method that can easily change a mode of notification related to the confirmed obstacle.

Means for Solving the Problem

According to a first aspect, a work machine obstacle notification system includes an obstacle determination unit configured to determine whether an obstacle is present in a periphery of a work machine, an action detection unit configured to detect an action of an operator of the work machine, an action determination unit configured to determine whether the detected action is a confirmation action executed at the time of safety confirmation, and a notification unit configured to change a mode of notification indicating the obstacle when the action is determined to be the confirmation action.

Effect of the Invention

According to the above aspect, the work machine obstacle notification system can easily change the mode of notification related to the confirmed obstacle.

BRIEF DESCRIPTION OF THE DRAWINGS

FIG. 5 is a table showing an example of information stored in action dictionary data according to the first embodiment.

EMBODIMENTS FOR CARRYING OUT THE INVENTION

First Embodiment

Hereinafter, an embodiment of the present invention is described with reference to the drawings.

<<Configuration of Work Machine 100>>

Figure 1:
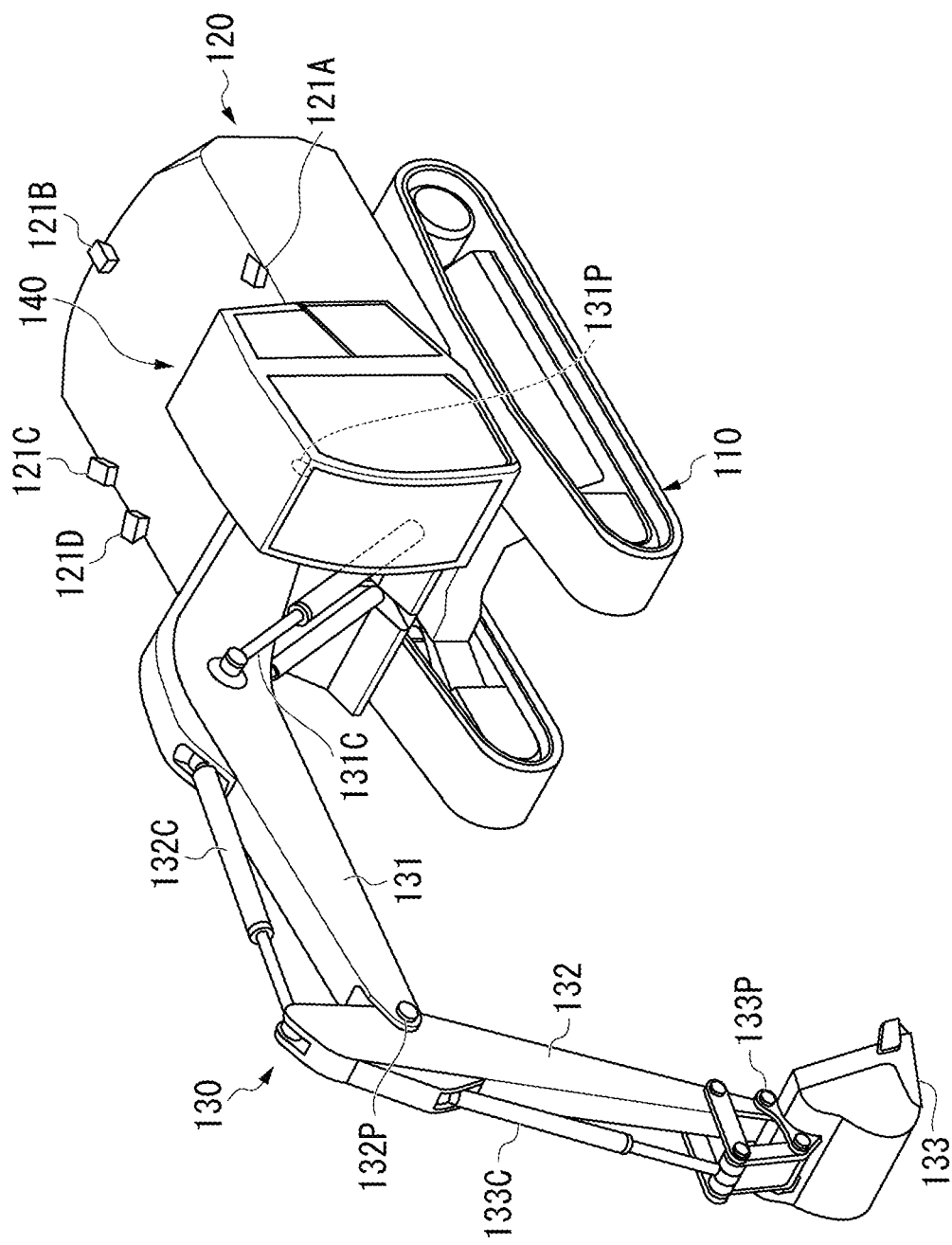
FIG. 1 is a schematic diagram showing a configuration of a work machine according to a first embodiment.

FIG. 1 is a schematic diagram showing a configuration of a work machine 100 according to a first embodiment.

The work machine 100 operates at a construction site and works against a construction target such as earth. The work machine 100 according to the first embodiment is, for example, a hydraulic excavator. The work machine 100 includes an undercarriage 110, a swing body 120, work equipment 130, and a cab 140.

The undercarriage 110 supports the work machine 100 to be travelable. The undercarriage 110 is, for example, a pair of right and left continuous tracks.

The swing body 120 is supported by the undercarriage 110 to be swingable around a swing center.

The work equipment 130 is driven by hydraulic pressure. The work equipment 130 is supported by a front portion of the swing body 120 to be drivable in an up-down direction. The cab 140 is a space in which an operator gets in and operates the work machine 100. The cab 140 is provided on a left front portion of the swing body 120.

Here, a portion of the swing body 120 to which the work equipment 130 is attached is referred to as a front portion.

In addition, in the swing body 120, a portion on an opposite side, a portion on a left side, and a portion on a right side with respect to the front portion are referred to as a rear portion, a left portion, and a right portion.

<<Configuration of Swing Body 120>>

Figure 2:
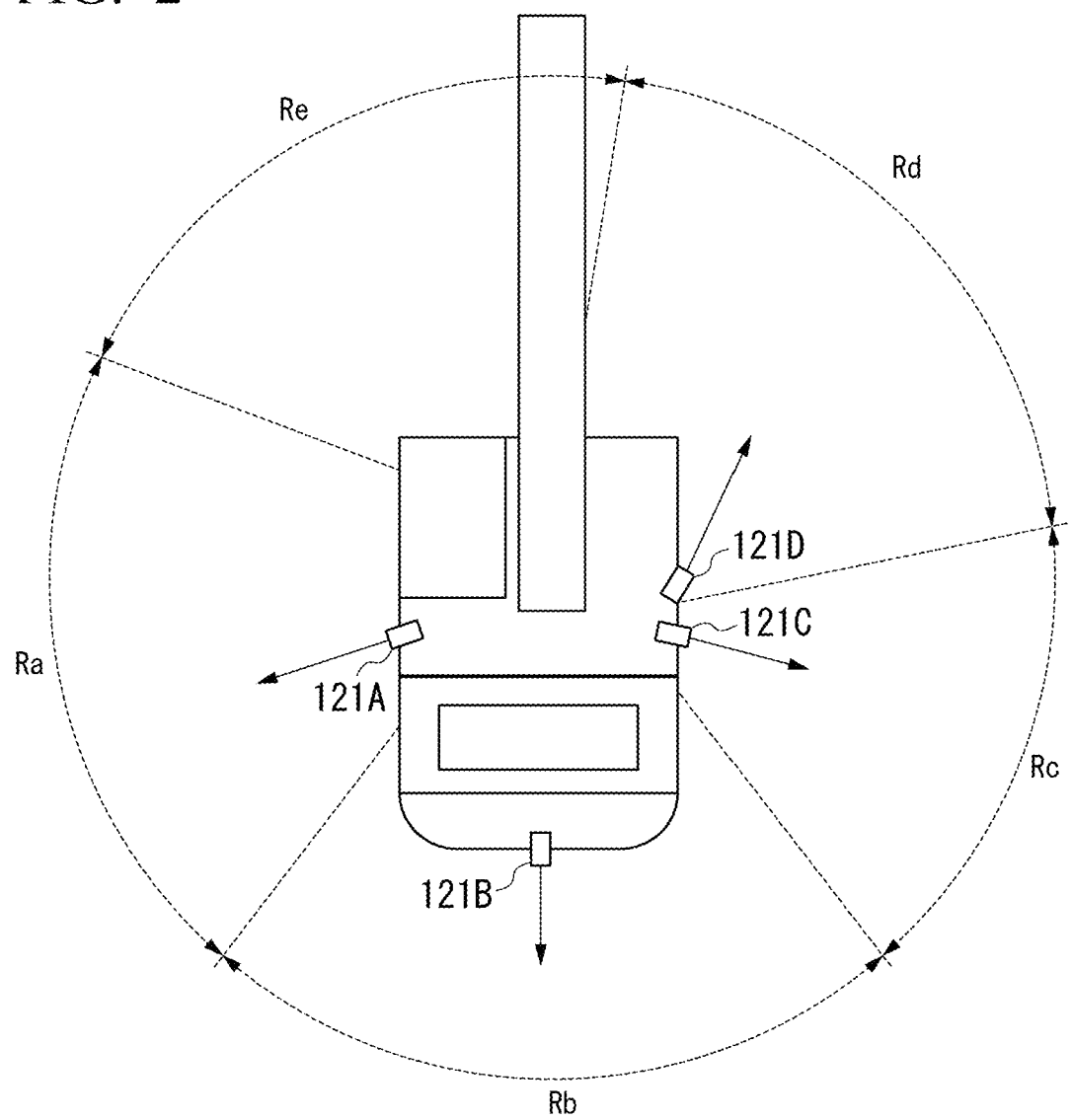
FIG. 2 is a diagram showing imaging ranges of a plurality of cameras provided in the work machine according to the first embodiment.

The swing body 120 is provided with a plurality of cameras 121 that capture images of the periphery of the work machine 100. FIG. 2 is a diagram showing imaging ranges of the plurality of cameras 121 provided in the work machine 100 according to the first embodiment.

Specifically, the swing body 120 is provided with a left rear camera 121A that captures an image of a left rear region Ra of the periphery of the swing body 120, a rear camera 121B that captures an image of a rear region Rb of the periphery of the swing body 120, a right rear camera 121C that captures an image of a right rear region Rc of the periphery of the swing body 120, and a right front camera 121D that captures an image of a right front region Rd of the periphery of the swing body 120. Incidentally, the imaging ranges of the plurality of cameras 121 may partially overlap each other.

The imaging ranges of the plurality of cameras 121 cover a range of an entire periphery of the work machine 100 excluding a left front region Re that is visually recognized from the cab 140. Incidentally, the camera 121 according to the first embodiment capture images of regions on left rear, rear, right rear, and right front regions of the periphery of the swing body 120, but are not limited thereto in another embodiment. For example, the number of the cameras 121 and the imaging ranges according to another embodiment may differ from the example shown in FIGS. 1 and 2.

Incidentally, as shown by a rear range Rb in FIG. 2, the left rear camera 121A captures an image of a range of a left side region and a left rear region of the periphery of the swing body 120, but may capture an image of one region thereof. Similarly, as shown by the right rear range Rc in FIG. 2, the right rear camera 121C captures an image of a range of a right side region and a right rear region of the periphery of the swing body 120, but may capture an image of one region thereof. Similarly, as shown by the right front range Rd in FIG. 2, the right front camera 121D captures an image of a range of a right front region and the right side region of the periphery of the swing body 120, but may capture an image of one region thereof. In addition, in another embodiment, the plurality of cameras 121 may be used such that the entire periphery of the work machine 100 is set as the imaging range. For example, the left front camera that captures the image of the left front range Re may be provided, and the entire periphery of the work machine 100 may be set as the imaging range.

<<Configuration of Work Equipment 130>>

The work equipment 130 includes a boom 131, an arm 132, a bucket 133, a boom cylinder 131C, an arm cylinder 132C, and a bucket cylinder 133C.

A proximal end portion of the boom 131 is attached to the swing body 120 with a boom pin 131P.

The arm 132 connects the boom 131 and the bucket 133. A proximal end portion of the arm 132 is attached to a distal end portion of the boom 131 with an arm pin 132P.

The bucket 133 includes teeth that excavate earth or the like, and an accommodating portion that accommodates the excavated earth. A proximal end portion of the bucket 133 is attached to a distal end portion of the arm 132 with a bucket pin 133P.

The boom cylinder 131C is a hydraulic cylinder to operate the boom 131. A proximal end portion of the boom cylinder 131C is attached to the swing body 120. A distal end portion of the boom cylinder 131C is attached to the boom 131.

The arm cylinder 132C is a hydraulic cylinder to drive the arm 132. A proximal end portion of the arm cylinder 132C is attached to the boom 131. A distal end portion of the arm cylinder 132C is attached to the arm 132.

The bucket cylinder 133C is a hydraulic cylinder to drive the bucket 133. A proximal end portion of the bucket cylinder 133C is attached to the arm 132. A distal end portion of the bucket cylinder 133C is attached to a link member connected to the bucket 133.

<<Configuration of Cab 140>>

Figure 3:
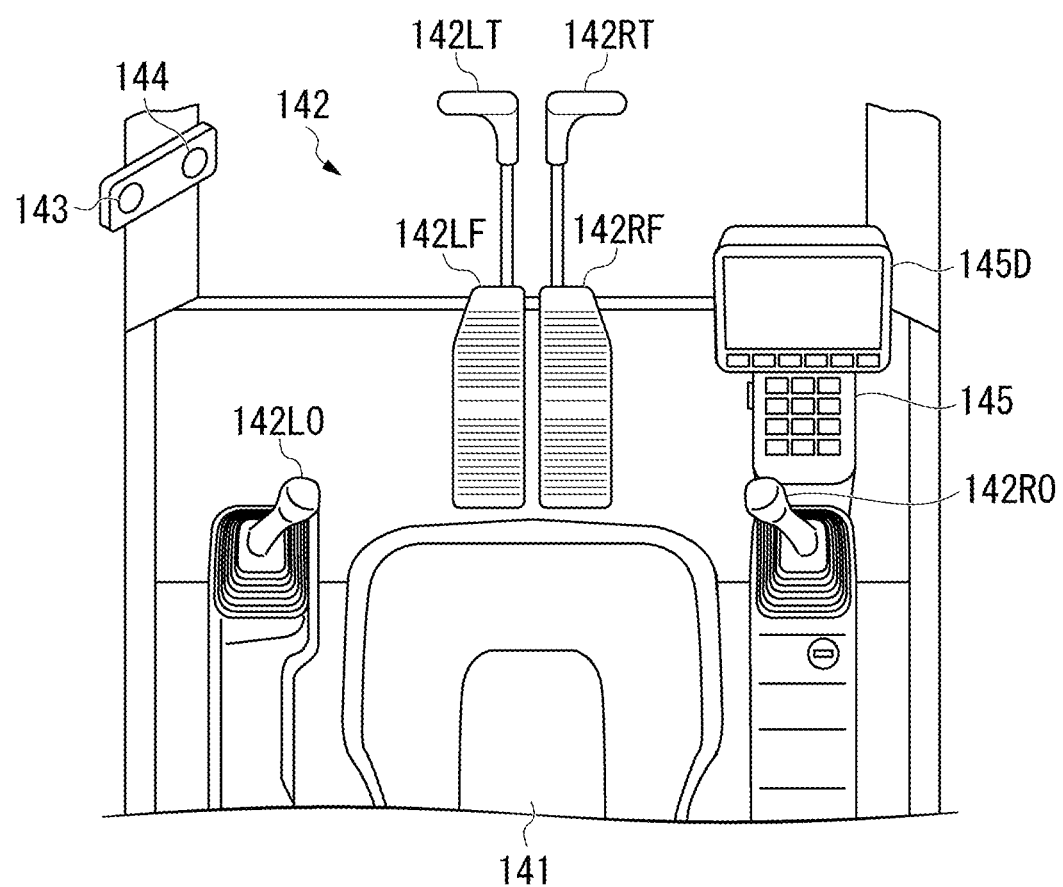
FIG. 3 is a diagram showing an internal configuration of a cab according to the first embodiment.

FIG. 3 is a diagram showing an internal configuration of the cab 140 according to the first embodiment.

A driver seat 141, an operation device 142, a microphone 143, a depth sensor 144, and a control device 145 are provided in the cab 140.

The operation device 142 is a device to drive the undercarriage 110, the swing body 120, and the work equipment 130 by a manual operation of the operator. The operation device 142 includes a left operation lever 142LO, a right operation lever 142RO, a left foot pedal 142LF, a right foot pedal 142RF, a left traveling lever 142LT, and a right traveling lever 142RT.

The left operation lever 142LO is provided on a left side of the driver seat 141. The right operation lever 142RO is provided on a right side of the driver seat 141.

The left operation lever 142LO is an operation mechanism to cause the swing body 120 to perform a swing operation and to cause the arm 132 to perform an excavating or dumping operation. Specifically, when the operator of the work machine 100 tilts the left operation lever 142LO forward, the arm 132 performs a dumping operation. In addition, when the operator of the work machine 100 tilts the left operation lever 142LO backward, the arm 132 performs an excavating operation. In addition, when the operator of the work machine 100 tilts the left operation lever 142LO in a right direction, the swing body 120 swings rightward. In addition, when the operator of the work machine 100 tilts the left operation lever 142LO in a left direction, the swing body 120 swings leftward. Incidentally, in another embodiment, when the left operation lever 142LO is tilted in a front-back direction, the swing body 120 may swing rightward or swing leftward, and when the left operation lever 142LO is tilted in a right-left direction, the arm 132 may perform an excavating operation or a dumping operation.

The right operation lever 142RO is an operation mechanism for performing an operation of causing the bucket 133 to excavate or dump and an operation of raising or lowering the boom 131. Specifically, when the operator of the work machine 100 tilts the right operation lever 142RO forward, a lowering operation of the boom 131 is executed. In addition, when the operator of the work machine 100 tilts the right operation lever 142RO backward, a rising operation of the boom 131 is executed. In addition, when the operator of the work machine 100 tilts the right operation lever 142RO in the right direction, a dumping operation of the bucket 133 is performed. In addition, when the operator of the work machine 100 tilts the right operation lever 142RO in the left direction, an excavating operation of the bucket 133 is performed. Incidentally, in another embodiment, when the right operation lever 142RO is tilted in the front-back direction, the bucket 133 may perform a dumping operation or an excavating operation, and when the right operation lever 142RO is tilted in the right-left direction, the boom 131 may perform a rising operation or a lowering operation.

The left foot pedal 142LF is disposed on a left side of a floor surface in front of the driver seat 141. The right foot pedal 142RF is disposed on a right side of the floor surface in front of the driver seat 141. The left traveling lever 142LT is pivotally supported by the left foot pedal 142LF, and is configured such that the inclination of the left traveling lever 142LT and the pressing down of the left foot pedal 142LF are linked to each other. The right traveling lever 142RT is pivotally supported by the right foot pedal 142RF, and is configured such that the inclination of the right traveling lever 142RT and the pressing down of the right foot pedal 142RF are linked to each other.

The left foot pedal 142LF and the left traveling lever 142LT correspond to rotational drive of a left crawler belt of the undercarriage 110. Specifically, when the operator of the work machine 100 tilts the left foot pedal 142LF or the left traveling lever 142LT forward, the left crawler belt rotates in a forward movement direction. In addition, when the operator of the work machine 100 tilts the left foot pedal 142LF or the left traveling lever 142LT backward, the left crawler belt rotates in a backward movement direction.

The right foot pedal 142RF and the right traveling lever 142RT correspond to rotational drive of a right crawler belt of the undercarriage 110. Specifically, when the operator of the work machine 100 tilts the right foot pedal 142RF or the right traveling lever 142RT forward, the right crawler belt rotates in the forward movement direction. In addition, when the operator of the work machine 100 tilts the right foot pedal 142RF or the right traveling lever 142RT backward, the right crawler belt rotates in the backward movement direction.

The microphone 143 is installed in the cab 140 and collects sound in the cab 140. In another embodiment, the microphone 143 may not be installed in the cab 140 and may be worn by the operator like a headset.

The depth sensor 144 is installed in the cab 140 to face the driver seat 141 from the front side. The depth sensor 144 measures the depth in the cab 140 and generates three-dimensional depth data. Exemplary examples of the depth sensor 144 include an infrared camera, LiDAR, or the like. Incidentally, the depth sensor 144 may be installed such that the driver can be detected, and may be installed outside the cab 140 in another embodiment.

The control device 145 includes a display 145D that displays information related to a plurality of functions of the work machine 100. The control device 145 is one example of a display system. In addition, the display 145D is one example of a display unit. Input means of the control device 145 according to the first embodiment is a hard key. Incidentally, in another embodiment, a touch panel, a mouse, a keyboard, or the like may be used as the input means.

<<Configuration of Control Device 145>>

Figure 4:
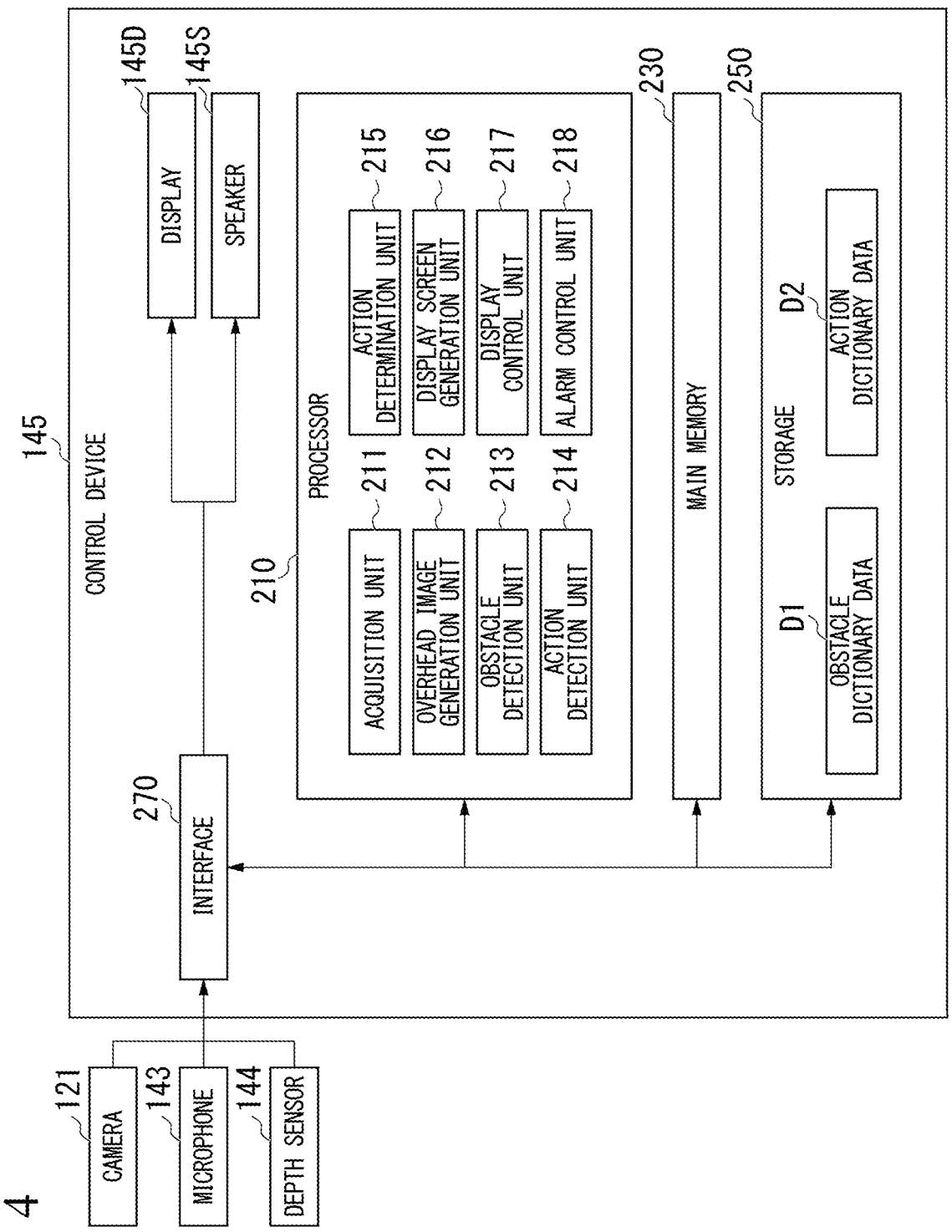
FIG. 4 is a schematic block diagram showing a configuration of a control device according to the first embodiment.

FIG. 4 is a schematic block diagram showing the configuration of the control device 145 according to the first embodiment.

The control device 145 is a computer including a processor 210, a main memory 230, a storage 250, and an interface 270. In addition, the control device 145 includes the display 145D and a speaker 145S. In addition, the control device 145 according to the first embodiment is provided integrally with the display 145D and the speaker 145S, but in another embodiment, at least one of the display 145D and the speaker 145S may be provided separately from the control device 145. Incidentally, when the display 145D and the control device 145 are separately provided, the display 145D may be provided outside the cab 140. In this case, the display 145D may be a mobile display. In addition, when the work machine 100 is driven by remote operation, the display 145D may be provided in a remote operation room provided remotely from the work machine 100. Similarly, when the speaker 145S and the control device 145 are separately provided, the speaker 145S may be provided outside the cab 140. In addition, when the work machine 100 is driven by remote operation, the speaker 145S may be provided in a remote operation room provided remotely from the work machine 100.

Incidentally, the control device 145 may be configured by a single computer, or the configuration of the control device 145 may be divided into a plurality of computers to be disposed, so that the plurality of computers may cooperate with each other to function as a work machine obstacle notification system. The work machine 100 may include a plurality of computers that function as the control device 145. A portion of the computers constituting the control device 145 may be mounted inside the work machine 100, and other computers may be provided outside the work machine 100.

Incidentally, the above-mentioned one control device 145 is also one example of the work machine obstacle notification system. In addition, in another embodiment, a portion of the configurations constituting the work machine obstacle notification system may be mounted inside the work machine 100, and other configurations may be provided outside the work machine 100. For example, the work machine obstacle notification system may be configured such that the display 145D is provided in a remote operation room provided remotely from the work machine 100. In yet another embodiment, one or a plurality of computers constituting the work machine obstacle notification system may all be provided outside the work machine 100.

The camera 121, the microphone 143, the depth sensor 144, the display 145D, and speaker 145S are connected to the processor 210 via the interface 270.

Exemplary examples of the storage 250 include an optical disk, a magnetic disk, a magneto-optical disk, a semiconductor memory, or the like. The storage 250 may be an internal medium that is directly connected to a bus of the control device 145 or may be an external medium connected to the control device 145 via the interface 270 or a communication line. The storage 250 stores a program for realizing the periphery monitoring of the work machine 100. In addition, the storage 250 stores in advance a plurality of images including an icon for displaying on the display 145D.

The program may realize a part of functions to be exhibited by the control device 145. For example, the program may exhibit functions in combination with another program that is already stored in the storage 250 or in combination with another program installed in another device. Incidentally, in another embodiment, the control device 145 may include a custom large scale integrated circuit (LSI) such as a programmable logic device (PLD) in addition to the above configuration or instead of the above configuration. Exemplary examples of the PLD include a programmable array logic (PAL), a generic array logic (GAL), a complex programmable logic device (CPLD), and a field programmable gate array (FPGA). In this case, a part or all of the functions to be realized by the processor 210 may be realized by the integrated circuit.

In addition, the storage 250 stores an obstacle dictionary data D1 for detecting an obstacle and an action dictionary data D2 indicating a confirmation action.

The obstacle dictionary data D1 may be, for example, dictionary data of a feature amount extracted from each of a plurality of known images in which an obstacle is reflected. Exemplary examples of the feature amount include histograms of oriented gradients (HOG), co-occurrence hog (CoHOG), or the like.

The action dictionary data D2 stores data indicating a confirmation action executed by the operator at the time of safety confirmation. The confirmation action is an action of the operator for confirming an obstacle. Exemplary examples of actions include a vocalization and a gesture of the operator. In addition, exemplary examples of the confirmation action include the pointing the direction in which the obstacle is present with a finger and the calling of the direction in which the obstacle is present, and it is preferable to confirm by both of them.

FIG. 5 is a diagram showing an example of information stored in the action dictionary data D2 according to the first embodiment. For example, the action dictionary data D2 according to the first embodiment stores a sound pattern, a gesture pattern, and a confirmation direction in association with each other.

The action dictionary data D2 stores the confirmation direction, "the left rear region Ra" in association with a sound pattern of "left rear, all right" and a gesture pattern indicating that the index finger points in a direction tilted to the left by 80 degrees or more and less than 160 degrees from the front direction of the cab.

The action dictionary data D2 stores the confirmation direction, "the rear region Rb" in association with a sound pattern of "rear, all right" and a gesture pattern indicating that the index finger points in a direction tilted to the right by 20 degrees or more and less than 50 degrees from the front direction of the cab. Incidentally, the gesture pattern indicating that the index finger points in a direction tilted to the right by 20 degrees or more and less than 50 degrees from the front direction of the cab indicates a gesture pointing the display 145D provided on the right side of the driver seat 141 as shown in FIG. 3.

The action dictionary data D2 stores the confirmation direction, "the right rear region Rc" in association with a sound pattern of "right rear, all right" and a gesture pattern indicating that the index finger points a direction tilted to the right by 80 degrees or more and less than 160 degrees from the front direction.

The action dictionary data D2 stores the confirmation direction, "the right front region Rd" in association with a sound pattern of "right front, all right" and a gesture pattern indicating that the index finger points a direction tilted to the right by 0 degrees or more and less than 90 degrees from the front direction.

Incidentally, the gesture pattern shown in FIG. 5 is one example, and may be another gesture as long as the gesture shows a confirmation operation of an obstacle. In addition, the numerical values of the angles related to the gesture pattern shown in FIG. 5 is one example, and is not limited to the values. In addition, the sound pattern shown in FIG. 5 is an example, and may be another sound as long as the sound indicates confirmation of an obstacle.

By running a program, the processor 210 includes an acquisition unit 211, an overhead image generation unit 212, an obstacle detection unit 213, an action detection unit 214, an action determination unit 215, a display screen generation unit 216, a display control unit 217, and an alarm control unit 218.

The acquisition unit 211 acquires measurement data from various sensors included in the work machine 100. Specifically, the acquisition unit 211 acquires captured images from the plurality of cameras 121, acquires a sound signal from the microphone 143, and acquires depth data from the depth sensor 144.

The overhead image generation unit 212 processes and combines a plurality of the captured images acquired by the acquisition unit 211 to generate an overhead image in which the work machine 100 is centered when a site is viewed from above. The overhead image generation unit 212 may cut out a portion of each of the processed captured images and combine the cutout captured images to generate an overhead image. An image of the work machine 100 viewed from above in a plan view is affixed in advance to the center of the overhead image generated by the overhead image generation unit 212. The overhead image is one example of a periphery image in which the periphery of the work machine 100 is reflected.

The obstacle detection unit 213 detects an obstacle from each captured image acquired by the acquisition unit 211. That is, the obstacle detection unit 213 is one example of an obstacle determination unit that determines whether an obstacle is present in the periphery of the work machine 100. Exemplary examples of an obstacle include a person, a vehicle, a rock, or the like. In addition, when an obstacle is detected, the obstacle detection unit 213 specifies a region in which the obstacle is present among the left rear region Ra, the rear region Rb, the right rear region Rc, and the right front region Rd.

The obstacle detection unit 213 detects an obstacle by, for example, the following procedure. The obstacle detection unit 213 extracts the feature amount from each captured image acquired by the acquisition unit 211. The obstacle detection unit 213 detects an obstacle from the captured image based on the extracted feature amount and the obstacle dictionary data. Exemplary examples of an obstacle detection method include pattern matching, object detection processing based on machine learning, or the like.

Incidentally, in the first embodiment, the obstacle detection unit 213 detects a person by using the feature amount of the image, but is not limited thereto. For example, in another embodiment, the obstacle detection unit 213 may detect an obstacle based on a measured value of light detection and ranging (LiDAR), or the like.

The action detection unit 214 detects the action of the operator based on the sound signal of the microphone 143 acquired by the acquisition unit 211 and the depth sensor 144. For example, the action detection unit 214 generates a sound character string indicating the vocalization content of the operator from the sound signal of the microphone 143 by the sound recognition technology. In addition, the action detection unit 214 generates three-dimensional data (skeleton data) indicating the skeleton posture of the operator from the captured image of the depth sensor 144 by the bone tracking technology. Hereinafter, the data indicating the action detected by the action detection unit 214 is referred to as action data.

The action determination unit 215 determines whether the action indicated by the action data acquired by the action detection unit 214 is a confirmation action executed at the time of safety confirmation. Specifically, the action determination unit 215 determines whether the sound character string and the skeleton posture acquired by the action detection unit 214 match the sound pattern and the gesture pattern stored in the action dictionary data D2.

When the gesture pattern matching the action data exists, the action determination unit 215 specifies the confirmation direction by the operator. That is, the action determination unit 215 reads out the confirmation direction associated with the gesture pattern matching the action data in the action dictionary data D2.

Incidentally, the action determination unit 215 according to another embodiment may determine the action by using the captured image itself as an input. For example, the action determination unit 215 may determine whether the action is a confirmation action based on the captured image by using pattern matching, a machine-learned discriminator, or the like. In this case, the action detection unit 214 may detect the captured image acquired by the acquisition unit 211 as action data. Incidentally, the captured image may be acquired by a camera instead of the depth sensor 144.

The display screen generation unit 216 generates a display screen data G1 in which a marker G12 indicating the position of an obstacle is disposed at the position corresponding to the detection position of the obstacle by being superimposed on an overhead image G11 generated by the overhead image generation unit 212. The disposition of the marker G12 on the display screen data G1 is one example of the notification of the presence of the obstacle. When the action determination unit 215 specifies the confirmation direction, the display screen generation unit 216 deletes the marker G12 disposed in the region corresponding to the confirmation direction. The deletion of the marker G12 is one example of changing the mode of notification. Incidentally, in another embodiment, the color of the marker G12 may be changed instead of the deletion of the marker G12.

An example of the display screen will be described later.

The display control unit 217 outputs the display screen data G1 generated by the display screen generation unit 216 to the display 145D. As a result, the display 145D displays the display screen data G1. The display control unit 217 is one example of a notification unit.

The alarm control unit 218 outputs an alarm sound signal to the speaker 145S when the obstacle detection unit 213 detects an obstacle. As a result, the speaker 145S starts sounding the alarm. An alarm is one example of the notification of the presence of an obstacle. The alarm control unit 218 stops the supply of the sound signal to the speaker 145S when the action determination unit 215 specifies the confirmation direction for all the regions in which the obstacles are detected. As a result, the speaker 145S stops the alarm. Stopping the alarm is one example of changing the mode of notification. Incidentally, in another embodiment, the volume of the alarm may be changed instead of stopping the alarm. For example, the volume of the alarm may be lowered when the confirmation direction is specified for all the regions in which the obstacles are detected. The alarm control unit 218 is one example of a notification unit.

<<About Display Screen>>

Figure 6:
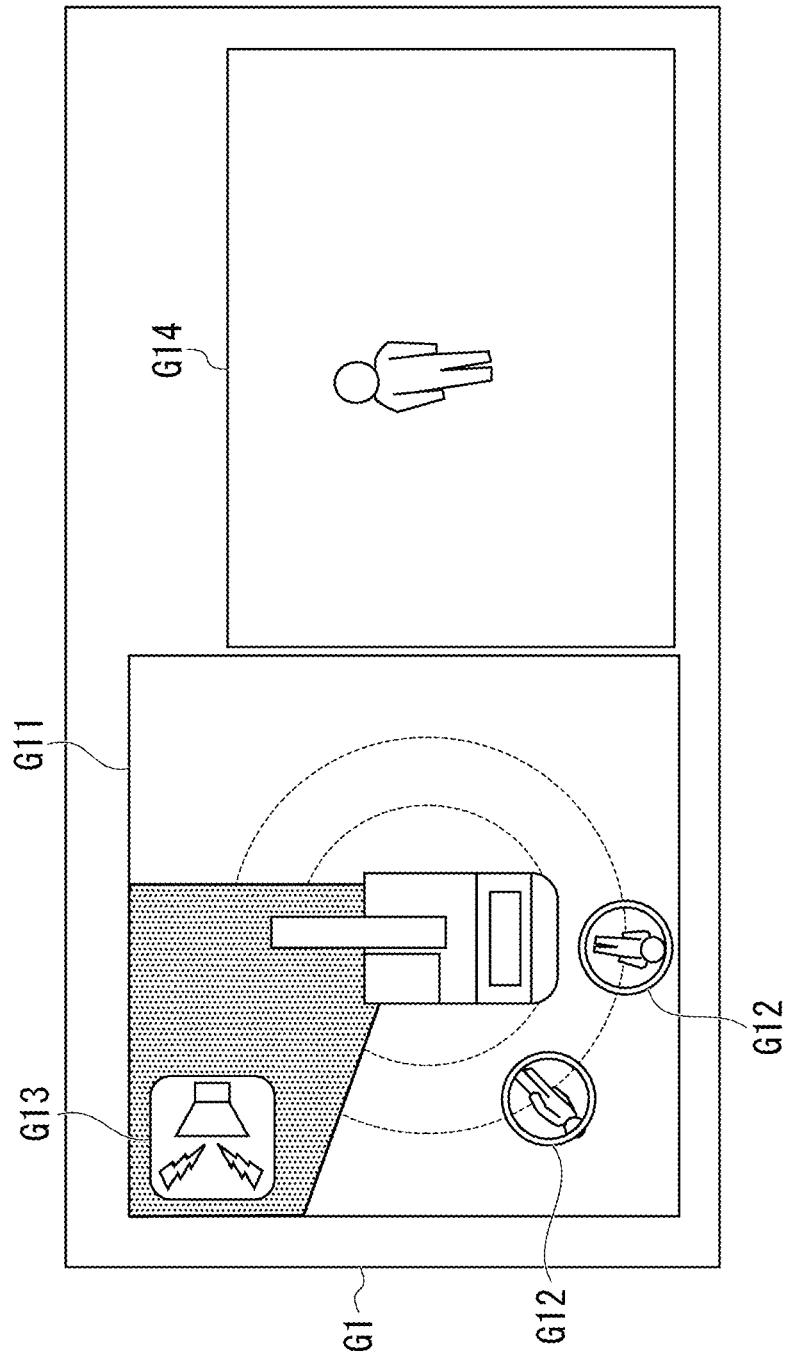
FIG. 6 is a diagram showing an example of a display screen according to the first embodiment.

FIG. 6 is a diagram showing an example of a display screen according to the first embodiment.

As shown in FIG. 6, the display screen data G1 includes the overhead image G11, the marker G12, an alarm icon G13, and a single camera image G14. Incidentally, in another embodiment, either the marker G12 or the alarm icon G13 may be included in the display screen data G1.

The marker G12 indicates the position of an obstacle. The shape of the marker G12 includes, for example, a circle, an ellipse, a regular polygon, and a polygon.

The alarm icon G13 represents the state of the alarm. The alarm icon G13 is displayed, for example, in red when the alarm is sounding. The alarm icon G13 is displayed, for example, in gray when the alarm is not sounding.

The single camera image G14 is a single camera image captured by one camera 121. Incidentally, although it is not easy for the operator to confirm the rear from the cab 140 of the work machine 100, the single camera image captured by the rear camera 121B or the overhead image G11 is displayed on the display screen data G1, so that the confirmation of the rear can be done by the pointing and calling of the display 145D.

<<Notification Method of Obstacle>>

Figure 7:
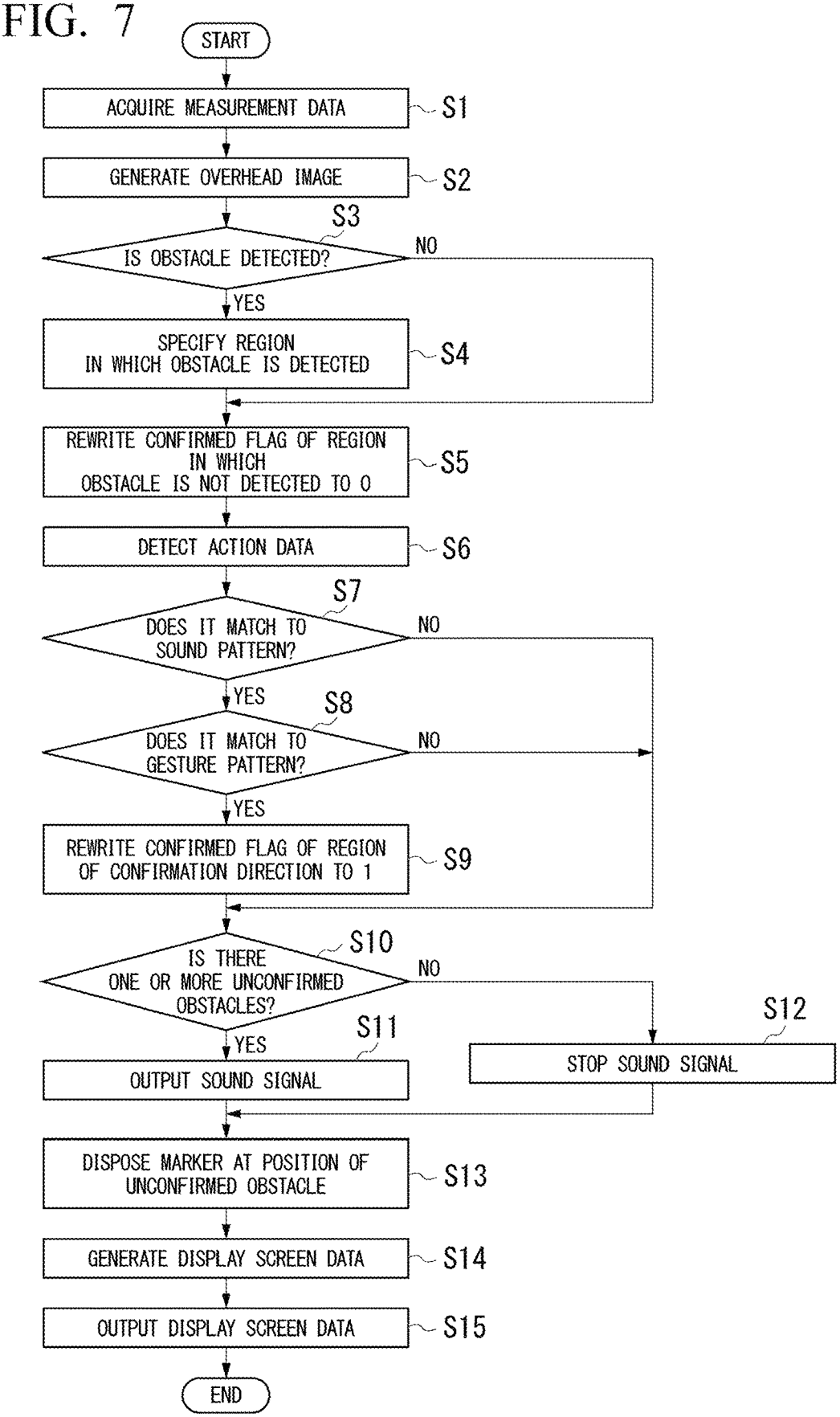
FIG. 7 is a flowchart showing an operation of the control device according to the first embodiment.

FIG. 7 is a flowchart showing an operation of the control device 145 according to the first embodiment.

When the control device 145 starts the periphery monitoring processing, a storage region that stores the confirmed flag indicating whether an obstacle is confirmed for each of the left rear region Ra, the rear region Rb, the right rear region Rc, and the right front region Rd is secured in the main memory 230, and the processing shown in FIG. 7 is repeatedly executed. The confirmed flag takes, for example, a value of 0 or 1, where 0 indicates unconfirmed and 1 indicates confirmed. The initial value of the confirmed flag is 0.

The acquisition unit 211 acquires measurement data from the plurality of cameras 121, the microphone 143, and the depth sensor 144 (step S1). That is, the acquisition unit 211 acquires captured images from the plurality of cameras 121, acquires a sound signal from the microphone 143, and acquires depth data from the depth sensor 144.

Next, the overhead image generation unit 212 processes and combines a plurality of the captured images acquired in the step S1 to generate the overhead image G11 in which the work machine 100 is centered when a site is viewed from above in a plan view (step S2). Next, the obstacle detection unit 213 executes an obstacle detection processing for each captured image acquired in the step S1 and determines whether an obstacle is detected (step S3).

When an obstacle is detected in the captured image (step S3: YES), the obstacle detection unit 213 specifies a region in which an obstacle is detected among the left rear region Ra, the rear region Rb, the right rear region Rc, and the right front region Rd (step S4). That is, when an obstacle is detected in the captured image of the left rear camera 121A, the obstacle detection unit 213 determines that the region in which the obstacle is detected is the left rear region Ra. When an obstacle is detected in the captured image of the rear camera 121B, the obstacle detection unit 213 determines that the region in which the obstacle is detected is the rear region Rb. When an obstacle is detected in the captured image of the right rear camera 121C, the obstacle detection unit 213 determines that the region in which the obstacle is detected is the right rear region Rc. When an obstacle is detected in the captured image of the right front camera 121D, the obstacle detection unit 213 determines that the region in which the obstacle is detected is the right front region Rd.

The obstacle detection unit 213 resets all the confirmed flags related to the region in which an obstacle is not detected to 0 (step S5). The value of the confirmed flag related to the region in which the obstacle is detected is maintained. That is, the value of the confirmed flag related to a region already confirmed by the pointing and calling among the regions in which the obstacle is detected is maintained at 1, and the value of the confirmed flag related to the unconfirmed region among the regions in which the obstacle is detected is maintained at 0. As a result, when an unconfirmed obstacle is no longer detected in the captured image, the confirmed flag related to the region is reset from 1 to 0.

The action detection unit 214 detects action data based on the sound signal of the microphone 143 acquired in the step S1 and the depth sensor 144 (step S6). That is, the action detection unit 214 detects the sound character string and the skeleton data indicating the action of the operator. Incidentally, when the alarm sounds from the speaker 145S, the precision of the sound recognition processing of the sound signal by the action detection unit 214 may decrease. Therefore, the action detection unit 214 detects that the sound signal contains a human voice, and the alarm control unit 218 may reduce the volume of the alarm output from the speaker 145S when the human voice is detected. The action determination unit 215 refers to the action dictionary data D2 and determines whether the sound character string matches any of the sound patterns stored in the action dictionary data D2 (step S7).

When the sound character string matches any of the sound patterns stored in the action dictionary data D2 (step S7: YES), the action determination unit 215 specifies the direction in which the index finger points from the skeleton data acquired in the step S6 and determines whether the skeleton data matches the gesture pattern associated with the sound pattern (step S8).

When the skeleton data matches the gesture pattern (step S8: YES), the action determination unit 215 determines that the action detected in the step S5 is the pointing and calling executed at the time of safety confirmation. The action determination unit 215 reads out the confirmation direction associated with the sound pattern according to the step S7 and the gesture pattern according to the step S8, and rewrites the value of the confirmed flag associated with the confirmation direction to 1 (step S9).

On the other hand, when the sound character string does not match any of the sound patterns (step S7: NO), or when the skeleton data does not match the gesture pattern (step S8: NO), the pointing and calling is not done properly, so that the value of the confirmed flag is maintained.

The alarm control unit 218 determines whether there is one or more unconfirmed obstacles among the obstacles detected in the step S3 (step S10). For example, the alarm control unit 218 determines that an obstacle present in the region in which the confirmed flag indicates 0 is unconfirmed. When an unconfirmed obstacle is present (step S10: YES), the alarm control unit 218 outputs an alarm sound signal to the speaker 145S (step S11). On the other hand, when an obstacle is not detected in the step S3, or when all the detected obstacles are present in the region in which the confirmed flag indicates 1 (step S10: NO), the alarm control unit 218 stops the output of the alarm sound signal (step S12).

The display screen generation unit 216 (display screen generation unit 216) disposes the marker G12 at a position corresponding to the unconfirmed obstacle specified in the step S10 in the overhead image G11 generated in the step S2 (step S13). Incidentally, the display screen generation unit 216 does not dispose the marker G12 at a position corresponding to the confirmed obstacle, that is, one among the obstacles detected in the step S4 that is present in the region in which the confirmed flag indicates 1. That is, among the markers G12 disposed in the display screen data G1 generated last time, the marker G12 disposed in the confirmation direction specified in the step S9 is not displayed in the display screen data G1 generated this time.

The display screen generation unit 216 generates display screen data G1 in which the overhead image G11, the single camera image G14 acquired in the step S1, and the alarm icon G13 indicating the alarm state are disposed (step S14). The display control unit 217 outputs the generated display screen data G1 to the display 145D (step S15).

By repeatedly executing the above processing, the control device 145 can attach the marker G12 to the detected obstacle superimposed on the overhead image G11, and delete the marker G12 when confirmation is made by the pointing and calling. In addition, the control device 145 can sound an alarm from the speaker 145S when an obstacle is detected, and can stop the alarm when all obstacles are confirmed by the pointing and calling.

Incidentally, the flowchart shown in FIG. 7 is one example, and in another embodiment, all the steps may not be necessarily executed. For example, in another embodiment, when the notification by the alarm is not performed, the processing of the steps S10 to S12 may not be executed. In addition, for example, in another embodiment, when the notification by display is not performed, the processing of the steps S13 to S15 may not be executed. In addition, in another embodiment, when the determination of the confirmation action is performed only by either the sound or the gesture, the determination in the step S7 or the step S8 may not be performed. In addition, in the flowchart shown in FIG. 7, a plurality of captured images, a sound signal, and depth data are acquired in the step S1, but is not limited to this timing, and the sound signal and the depth data may be acquired before the detection of the action data in the step S6. In addition, in the flowchart shown in FIG. 7, after the processing of outputting or stopping the sound signal in the steps S10 to S12, the marker is disposed at the position of the unconfirmed obstacle in the step S13, but in another embodiment, at the timing of outputting the sound signal in the step S11, the marker may be disposed at the position of the unconfirmed obstacle. That is, in another embodiment, the processing of the step S13 may be performed only when there is one or more unconfirmed obstacles.

<<Operation Example>>

Hereinafter, an operation example of the control device 145 according to the first embodiment will be described with reference to the drawings.

Figure 8:
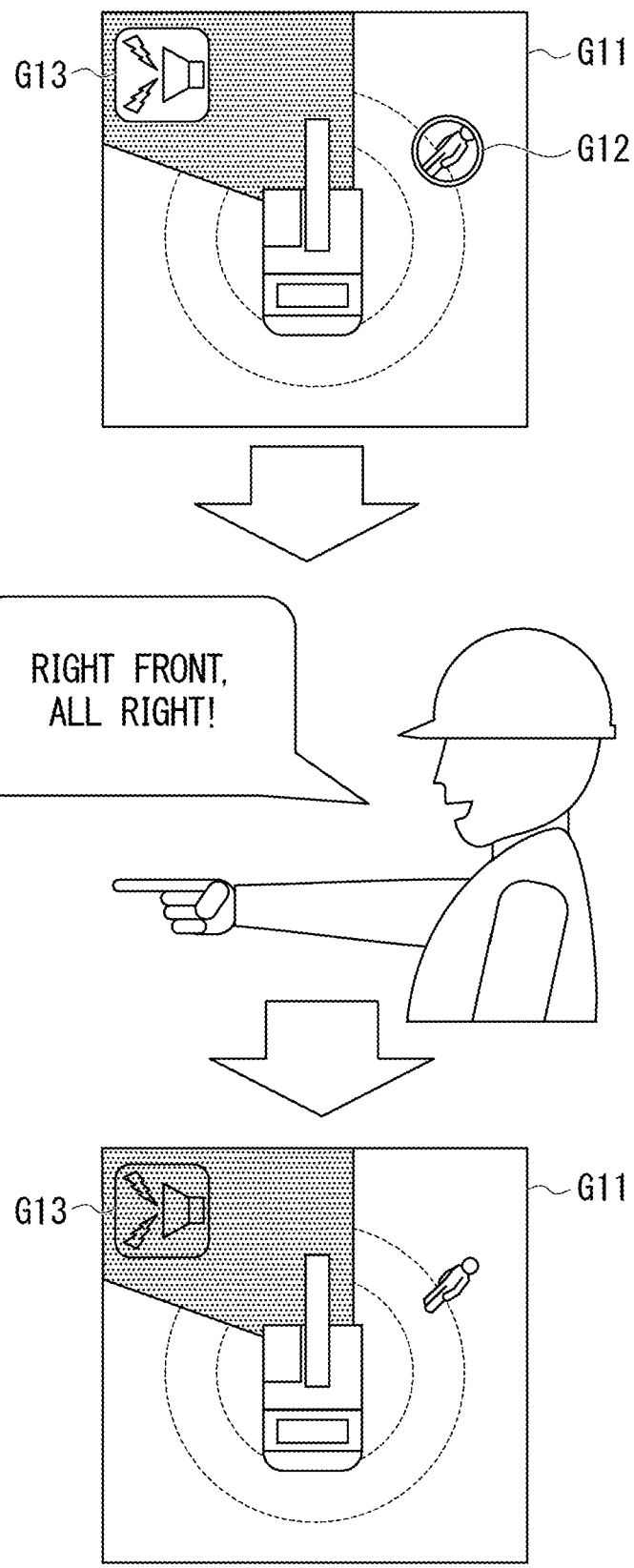
FIG. 8 is a diagram showing a first operation example of the control device according to the first embodiment.

FIG. 8 is a diagram showing a first operation example of the control device 145 according to the first embodiment.

When the obstacle detection unit 213 of the control device 145 detects an obstacle in the periphery of the work machine 100 in the step S3, the obstacle detection unit 213 specifies the region detected in the step S4. Here, for example, when an obstacle is detected in the captured image of the right front camera 121D, the obstacle detection unit 213 specifies the region in which the obstacle is detected as the right front region Rd. At this time, since all the confirmed flags are 0, the display screen generation unit 216 disposes the marker G12 at the position of the obstacle in the overhead image G11 in the step S13 as shown in FIG. 8. In addition, at this time, since the alarm control unit 218 outputs a sound signal to the speaker 145S, the alarm icon G13 is displayed in red, for example.

By listening to the alarm issued from the speaker 145S and visually recognizing the display 145D, the operator recognizes that an obstacle is present in the right front region Rd. The operator performs the pointing and calling to confirm the obstacle. That is, as shown in FIG. 8, the operator calls "right front, all right" and points to the obstacle in the right front region Rd.

At this time, in the step S6, the action detection unit 214 of the control device 145 detects the character string "right front, all right" from the sound signal of the microphone 143, and also detects the skeleton data pointing in the right front direction from the depth sensor 144. The detected action data matches the pattern of the confirmation action related to the right front region Rd. Therefore, the action detection unit 214 rewrites the confirmed flag related to the right front region Rd to 1 in the step S9. Since the confirmed flag related to the right front region Rd is 1, the display screen generation unit 216 does not dispose the marker G12 at the position of the obstacle in the overhead image G11 in the step S13. In addition, since the alarm control unit 218 stops the output of the sound signal to the speaker 145S, the alarm icon G13 is displayed in gray, for example.

As described above, the control device 145 according to the first embodiment can stop the notification of the obstacle by the action of the pointing and calling by the operator.

Figure 9:
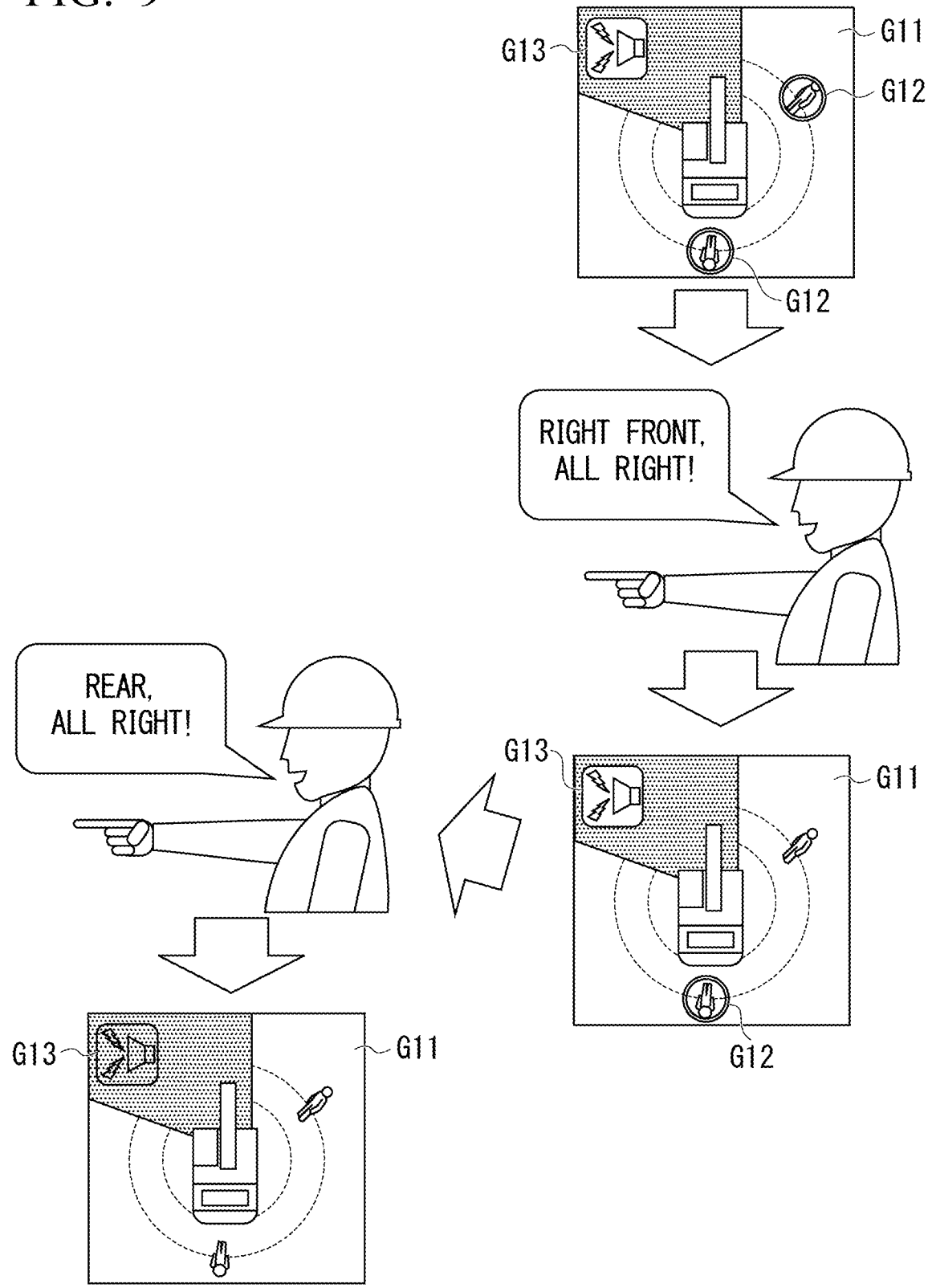
FIG. 9 is a diagram showing a second operation example of the control device according to the first embodiment.

FIG. 9 is a diagram showing a second operation example of the control device 145 according to the first embodiment.

When the obstacle detection unit 213 of the control device 145 detects an obstacle in the periphery of the work machine 100 in the step S3, the obstacle detection unit 213 specifies the region detected in the step S4. Here, for example, when an obstacle is detected in the captured image of the right front camera 121D and the captured image of the rear camera 121B, the obstacle detection unit 213 specifies that the regions in which the obstacle is detected are the right front region Rd and the rear region Rb. At this time, since all the confirmed flags are 0, the display screen generation unit 216 disposes the marker G12 at the position of each obstacle in the overhead image G11 in the step S13 as shown in FIG. 9. In addition, at this time, since the alarm control unit 218 outputs a sound signal to the speaker 145S, the alarm icon G13 is displayed in red, for example.

By listening to the alarm output from the speaker 145S and visually checking the display 145D, the operator recognizes that obstacles are present in the right front region Rd and the rear region Rb. The operator first performs the pointing and calling to confirm the obstacle in the right front region Rd. That is, as shown in FIG. 9, the operator calls "right front, all right" and points to the obstacle in the right front region Rd.

In the step S6, the action detection unit 214 of the control device 145 detects the character string "right front, all right" from the sound signal of the microphone 143, and also detects the skeleton data pointing in the right front direction from the depth sensor 144. The detected action data matches the pattern of the confirmation action related to the right front region Rd. Therefore, the action detection unit 214 rewrites the confirmed flag related to the right front region Rd to 1 in the step S9. Since the confirmed flag related to the right front region Rd is 1, the display screen generation unit 216 does not dispose the marker G12 at the position of the obstacle in the right front region Rd in the step S13. On the other hand, since the confirmed flag related to the rear region Rb remains 0, the display screen generation unit 216 disposes the marker G12 at the position of the obstacle in the rear region Rb in the step S13. In addition, since the obstacle in the region in which the confirmed flag is 0 is detected, the alarm control unit 218 continues to output the sound signal. Therefore, the color of the alarm icon G13 is maintained.

Next, the operator performs the pointing and calling to confirm the obstacle in the rear region Rb. That is, as shown in FIG. 9, the operator calls "rear, all right" and points to the single camera image G14 of the rear camera 121B displayed on the display 145D.

In the step S6, the action detection unit 214 of the control device 145 detects the character string "rear, all right" from the sound signal of the microphone 143, and also detects the skeleton data pointing the direction of the display 145D from the depth sensor 144. The detected action data matches the pattern of the confirmation action related to the rear region Rb. Therefore, the action detection unit 214 rewrites the confirmed flag related to the rear region Rb to 1 in the step S9. As a result, since the confirmed flags related to the right front region Rd and the rear region Rb become 1, the display screen generation unit 216 does not dispose the marker G12 at the positions of the obstacles in the step S13. In addition, since the confirmed flags related to the region in which the obstacles are detected are all 1, the alarm control unit 218 stops the output of the sound signal. Therefore, the alarm icon G13 is displayed in gray, for example.

As described above, the control device 145 according to the first embodiment maintains the notification related to the obstacle on which the pointing and calling is not performed by the operator. As a result, the control device 145 can prevent overlooking the obstacle.

<<Effects>>

When determination is made that an obstacle is present in the periphery of the work machine 100, the control device 145 according to the first embodiment starts notifying the presence of the obstacle, and changes the mode of notification when determination is made that the action of the operator is the confirmation action that is executed at the time of safety confirmation. As a result, the operator can change the mode of notification related to the confirmed obstacle only by executing the confirmation action necessary for confirming the obstacle.

The control device 145 according to the first embodiment determines whether an obstacle is present in each of a plurality of regions centered on the work machine 100, and ends the notification based on the region related to the confirmation action among the plurality of regions. As a result, the occurrence of overlooking the obstacle by the operator can be prevented.

<<Another Embodiment>>

The embodiments have been described above in detail with reference to the drawings; however, the specific configurations are not limited to the above-described configurations, and various design changes or the like can be made. Namely, in another embodiment, the order of the above-described processing may be appropriately changed. In addition, some of the processing may be executed in parallel.

In the above-described embodiment, the work machine 100 includes the plurality of cameras 121 to detect an obstacle, the microphone 143 and the depth sensor 144 to detect a gesture, and the speaker 145S to output an alarm, but is not limited thereto. For example, in another embodiment, at least one of the above configurations may be provided outside the work machine 100. For example, the control device 145 according to another embodiment may perform at least one of detection of an obstacle, detection of a gesture, and output of an alarm based on the measurement data of the speaker and the camera installed in the site and the speaker and the camera included in the other work machine 100.

Incidentally, the confirmation action according to the above-described embodiment is the pointing and calling, but is not limited thereto in another embodiment.

In addition, the control device 145 according to the above-described embodiment ends the notification when the confirmation action is performed, but is not limited thereto. For example, in another embodiment, when the confirmation action is performed, the color of the marker G12 may be changed, and the volume of the alarm may be decreased.

In addition, the control device 145 according to the above-described embodiment performs the notification of the obstacle by the display of the marker G12 on the display 145D, the display of the alarm icon G13, and the alarm from the speaker 145S, but is not limited thereto in another embodiment. For example, the control device 145 according to another embodiment may perform the notification of the obstacle by the intervention control of the work machine 100. For example, the control device 145 may restrict the swing of the swing body 120 in the direction in which the obstacle is present, and may release the restriction when the confirmation action for the obstacle is detected.

In addition, the control device 145 according to the above-described embodiment extracts a character string from the sound signal and performs sound matching based on the character string, but is not limited thereto. For example, the control device 145 according to another embodiment may store a trained model for each sound pattern learning based on the sound of the sound pattern, and perform sound matching by specifying the trained model having the highest degree of similarity.

In addition, the control device 145 according to the above-described embodiment specifies the confirmation direction by matching the sound and the gesture, but is not limited thereto. For example, the control device 145 according to another embodiment may not have to match the sound pattern. In this case, the confirmation direction may be specified only by the gesture pattern, or the confirmation direction may be specified by the combination of the matching of the gesture pattern and the presence or absence of the occurrence by the operator.

In addition, for example, the control device 145 according to another embodiment may not have to match the gesture pattern. In this case, the confirmation direction may be specified only by the sound pattern, or the confirmation direction may be specified by the combination of the matching of the sound pattern and the matching of the finger shape.

In addition, in the above-described embodiment, the gesture pattern related to the rear region indicates that the display 145D is pointed to, but is not limited thereto. For example, in another embodiment, it may be a gesture pattern indicating that the direction of the index finger points backward. In addition, in another embodiment, the gesture pattern related to the other region may indicate that the display 145D is pointed to.

In addition, in the above-described embodiment, the gesture pattern related to each region is different, but is not limited thereto. For example, in another embodiment, the gesture pattern of each region may be a common gesture pattern. For example, it may be a gesture indicating a confirmation operation such as pointing an index finger at the display 145D on which each region is displayed.

In addition, in the above-described embodiment, the sound pattern related to each region is different, but is not limited thereto. For example, in another embodiment, the sound pattern of each region may be a common sound pattern such as "all right" or "confirmation all right".

In addition, in the above-described embodiment, the confirmation action executed at the time of safety confirmation includes confirming an obstacle by direct visual inspection, but is not limited thereto. For example, the confirmation action according to another embodiment may include visual inspection of an image of an obstacle, the marker G12, or the like displayed on the display 145D, and a confirmation operation on the display 145D.

In addition, the work machine 100 according to the above-described embodiment is a hydraulic excavator, but is not limited thereto. For example, the work machine 100 according to another embodiment may be another work machine such as a dump truck, a bulldozer, or a wheel loader.

INDUSTRIAL APPLICABILITY

According to the above aspect, the work machine obstacle notification system can easily change the mode of notification related to the confirmed obstacle.

The invention claimed is:

1. A work machine obstacle notification system comprising:
a processor configured to:
acquire captured images from a plurality of cameras that are provided at a work machine;
combine the captured images to generate an overhead image in which the work machine is centered when a site is viewed from above;
determine whether an obstacle is present in a periphery of the work machine from the captured images;
generate a display screen data in which a marker indicating a detection position of the obstacle is disposed at a position corresponding to the detection position of the obstacle by being superimposed on the overhead image;
output the display screen data to a display so that the display displays the display screen data;
detect an action of an operator of the work machine by a microphone and an image sensor;
generate (i) sound data from a sound signal of the microphone and (ii) three-dimensional gesture data from an image captured by the image sensor, wherein the sound data and the gesture data represent the detected action of the operator;
determine whether the sound data indicate that the obstacle is present;
based on determining that the sound data indicate that the obstacle is present, determine whether the gesture data indicates that the obstacle is present;
based on determining that both of the sound data and the gesture data indicate that the obstacle is present, determine that the detected action is a confirmation action of the operator recognizing that the obstacle is present in the periphery of the work machine; and
based on determining that the detected action is the confirmation action, change the marker disposed at the position corresponding to the detecting position of the obstacle in the display screen data displayed by the display.

2. The work machine obstacle notification system according to claim 1, wherein the processor is configured to:
determine whether a plurality of obstacles are present in the periphery of the work machine; and
based on determining that the plurality of obstacles are present in the periphery of the work machine, change a mode of a notification related to an obstacle for which the confirmation action is determined among the plurality of obstacles.

3. The work machine obstacle notification system according to claim 1, wherein the processor is configured to:
determine whether a plurality of obstacles are present in the periphery of the work machine; and
change a mode of a notification for each of the plurality of obstacles based on determining that the confirmation action is performed for all of the plurality of obstacles.

4. The work machine obstacle notification system according to claim 1,
wherein the confirmation action includes a gesture of the operator pointing in a direction in which the obstacle is present.

5. The work machine obstacle notification system according to claim 1,
wherein the confirmation action includes a sound of the operator calling a direction in which the obstacle is present.

6. A work machine obstacle notification method comprising:
acquiring captured images from a plurality of cameras that are provided at a work machine;
combining the captured images to generate an overhead image in which the work machine is centered when a site is viewed from above;
determining whether an obstacle is present in a periphery of the work machine from the captured images;
generating a display screen data in which a marker indicating a detection position of the obstacle is disposed at a position corresponding to the detection position of the obstacle by being superimposed on the overhead image;
outputting the display screen data to a display so that the display displays the display screen data;
detecting an action of an operator of the work machine by a microphone and an image sensor;
generating (i) sound data from a sound signal of the microphone and (ii) three-dimensional gesture data from an image captured by the image sensor, wherein the sound data and the gesture data represent the detected action of the operator;
determining whether the sound data indicate that the obstacle is present;
based on determining that the sound data indicate that the obstacle is present, determining whether the gesture data indicates that the obstacle is present;
based on determining that both the sound data and the gesture data indicate that the obstacle is present, determining that the detected action is a confirmation action of the operator recognizing that the obstacle is present in the periphery of the work machine; and
based on determining that the detected action is the confirmation action, changing the marker disposed at the position corresponding to the detecting position of the obstacle in the display screen data displayed by the display.

7. The work machine obstacle notification system according to claim 1, wherein the processor is configured to:
determine whether a plurality of obstacles are present in the periphery of the work machine;
determine whether the confirmation action is not performed for one or more obstacles among the plurality of obstacles; and
based on determining that the confirmation action is not performed for the one or more obstacles among the plurality of obstacles, output an alarm sound through a speaker.

8. The work machine obstacle notification system according to claim 7, wherein the processor is configured to, based on determining that the confirmation action is performed for all of the plurality of obstacles, stop outputting the alarm sound.

9. The work machine obstacle notification system according to claim 7, wherein the processor is configured to generate the marker to be superimposed on each of the one or more obstacles among the plurality of obstacles.

* * * * *